United States Patent [19]

Tazaki et al.

[11] 3,761,818

[45] Sept. 25, 1973

[54] MULTILEVEL SIGNAL TRANSMISSION SYSTEM

[75] Inventors: Kimio Tazaki, Tokyo; Hajime Yamamoto, Tokyo; Shigehiko Hinoshita, Yokohama; Shoji Hagiwara, Tokyo, all of Japan

[73] Assignees: Nippon Telegraph & Telephone Public Corporation, Tokyo; Fujitsu Limited, Kawasaki, both of Japan

[22] Filed: Apr. 27, 1972

[21] Appl. No.: 248,282

[30] Foreign Application Priority Data

Apr. 30, 1971 Japan .............................. 46/29082

[52] U.S. Cl. ............ 325/38 A, 178/DIG. 3, 178/68

[51] Int. Cl. ........................ H04l 27/02, H04l 15/00

[58] Field of Search ......................... 325/38 A, 144; 340/347 AD; 178/68, DIG. 3; 179/15.55

[56] References Cited

UNITED STATES PATENTS

| | | | |
|---|---|---|---|
| 3,573,622 | 4/1971 | Holzman et al. | 325/38 A |
| 3,611,143 | 10/1971 | Van Gerwin | 325/42 |
| 3,665,474 | 5/1972 | Thayer | 343/200 |
| 3,699,446 | 10/1972 | Sainte-Beuve | 325/38 A |
| 3,701,144 | 10/1972 | Fineran | 340/347 AD |

*Primary Examiner*—Daryl W. Cook
*Attorney*—Staas, Halsey & Gable

[57] ABSTRACT

Apparatus for transmitting a signal in the form of a multilevel signal is disclosed which is adapted for correction of variations in sampling time of the multilevel signal. In particular, the multilevel signal transmission system transmits a multilevel signal as it is or with a reference level signal of a predetermined level inserted before transmission in the multilevel signal with a predetermined period. After transmission along a line, the received signal waveform is sampled on the receiving side of the transmission line at a predetermined sampling time to detect a level error between the level of the sampled received signal waveform and a predetermined correct level of the signal to be transmitted. The correlation of the detected level error of the sampled signal with a level difference signal between the sampled signal and a neighboring signal (or with a signal representing the polarity of the level difference signal) is determined to thereby control the sampling time.

11 Claims, 13 Drawing Figures

MULTILEVEL SIGNAL TRANSMISSION SYSTEM

BACKGROUND OF THE INVENTION

1. Field of the Invention

This invention relates to apparatus for transmitting signals over conventional, low bandwidth transmission lines, and in particular, to apparatus for operating upon the transmitted signals to correct for variations in sampling period of the transmitted signal.

2. Description of the Prior Art

For efficient digital signal transmission using a transmission line of relatively high transmission performance, a signal is usually transmitted in the form of a multilevel signal to provide for reduced bandwidth necessary for the signal transmission. In this case, a transmission pulse may have one of predetermined $p$'s amplitude values, and accordingly this implies that information of $\log_2 p$ bit can be transmitted with one pulse. The multilevel signal transmission system necessitates correct transmission of pulse amplitude at the price of reduction of the bandwidth necessary for transmission, but, as the number $p$ of the levels of the multilevel signal increases, many technical difficulties are encountered in correct transmission of the amplitude levels.

Namely, in order to identify the level of the received signal, it is necessary that the "eye" of the eye pattern of the received waveform is open in the vicinity of each level value. Further, each level of the received multilevel signal must be clearly distinguished from the others by a threshold level lying at the center of the eye opening in the vicinity of each level. In the event that each level of the received multilevel signal deviates in excess of the upper threshold level or the lower threshold level, the rate of producing an error due to noise or intersymbol interference from other symbols increases. Further, it is necessary that the sample pulse used for reading out the eye pattern in this case, is synchronized with the repetitive cycle of the multilevel signal and that the phase of the sampling pulse coincides with the maximum opening portion of the eye opening. More specifically, if the phase of the sampling pulse shifts to lie before or after the maximum opening portion of the eye opening, the rate of causing an error by noise or intersymbol interference increases. Timing information for correct positioning of the sampling pulse is usually transmitted by some means together with the multilevel signal and, on the receiving side, the timing information is extracted to determine the sample time. However, the aforesaid phase shift of the sampling pulse is caused by phase drift of a timing information extracting circuit, by phase distortion of the transmission line, and by interference with the timing information by noise or signal component or the like. As the eye opening becomes narrower with an increase in the number of the levels of the multilevel signal, the allowable value of the phase shift becomes very small.

SUMMARY OF THE INVENTION

It is therefore an object of this invention to provide a novel multilevel signal transmission system which utilizes a time constant of the interference with the timing information caused by the timing information extracting circuit or the like is very large and that therefore a change in the phase of the sampling pulse is very slow and in which deviation, the sampling time of a previously received signal is detected to control the sampling time of a subsequently received signal, thereby ensuring sampling exactly coincident with the maximum opening portion of the eye opening.

It is another object of this invention to provide a multilevel signal transmission system in which the difference between the level of a specified one of received signals and a predetermined level therefor to be transmitted, that is, a level error therebetween is detected to extract deviation in the sampling time, and the correlation of the detected level error of the specified signal with a level difference signal between the specified signal and a signal adjacent thereto (or with a signal representing the polarity of the level difference signal), is detected and then deviation in the sampling time is corrected based upon the detected result.

It is a still further object of this invention to provide a multilevel signal transmission system in which a reference level signal of a predetermined level is inserted in a multilevel signal train, a level error between the received level of the reference level signal and its predetermined level is detected, the correlation of the level error of the reference level signal with a level difference signal between the reference level signal and a signal adjacent thereto (or with a signal representing the polarity of the level difference signal), is detected and deviation in the sampling time of subsequently received signals is corrected based upon the detected result.

It is a further object of this invention to provide a multilevel signal transmission system which employs novel means for inserting a reference level signal in a multilevel signal train with a predetermined period.

It is a still further object of this invention to provide a multilevel signal transmission system in which when a multilevel signal to be transmitted is represented in the form of a binary number of $n$'s bits, the level of a reference level signal is selected at the transition point of binary digit of a desired position and a level error of the reference level signal is detected with respect to the binary digit of the selected position.

It is still another object of this invention to provide a multilevel signal transmission system in which more than $n+1$ bits are decoded for detecting the aforesaid level error (or errors) of one or all of the levels of the multilevel signal and the level error (or errors) are detected with a binary digit of a position less significant than the least significant one of the $n$'s bits.

For attainment of these and other objects, the present invention detects a level error in connection with a specified one of received signals, the correlation of the level error with a level difference signal between the specified signal and a signal adjacent thereto (or with a signal representative of the polarity of the level difference signal) is detected to extract deviation in the sampling time, based upon which deviation in the sampling time of subsequently received signals is corrected.

DETAILED DESCRIPTION OF THE PREFERRED EMBODIMENT

For efficient digital signal transmission with reduced bandwidth necessary for the transmission, the signal is usually transmitted in the form of a multilevel signal. FIG. 1 shows one example of a multilevel signal MLS, for example, an octonary signal, the abscissa representing time and the ordinate representing signal amplitude level. RLS indicates a reference level signal. Generally, the levels of the multilevel signal to be transmitted are generated at random and the reference level signal RLS having, for example, one predetermined level, is inserted in the multilevel signal with a predetermined period T.

Figure 1A:
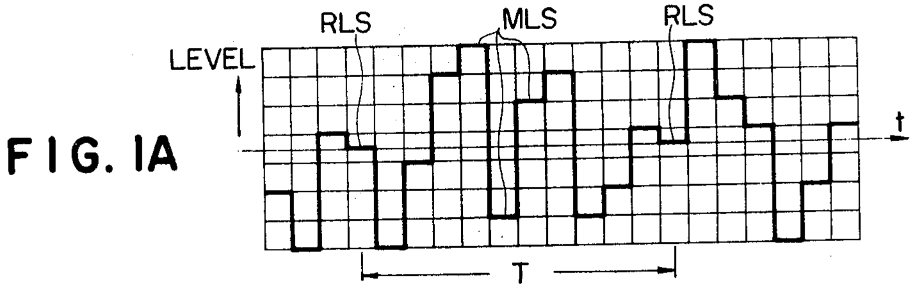
FIG. 1A shows a multilevel signal, for example, an octonary signal to be transmitted in accordance with the present invention.
Figure 1B:
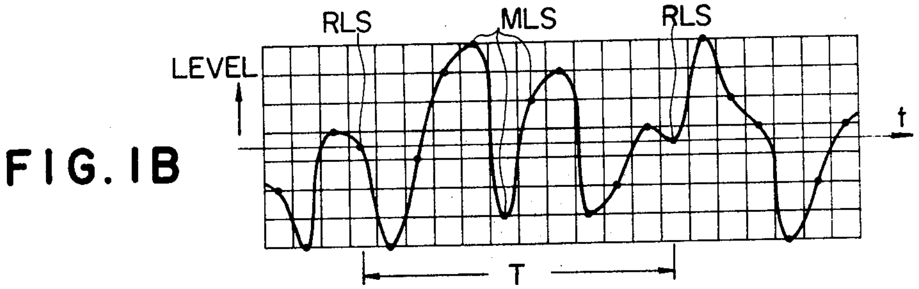
FIG. 1B shows a received multilevel signal smoothed by a transmission line.

Such a waveform as depicted in FIG. 1A becomes smoothed as shown in FIG. 1B when transmitted through a transmission line. FIG. 1B shows a waveform such that the level values (indicated by dots) of the multilevel signal at respective sampling times are rolled off to represent correct levels but, in general, the received waveform is deformed by distortion, DC drift and gain fluctuation in the transmission line and the levels themselves are also deformed.

Figure 2A:
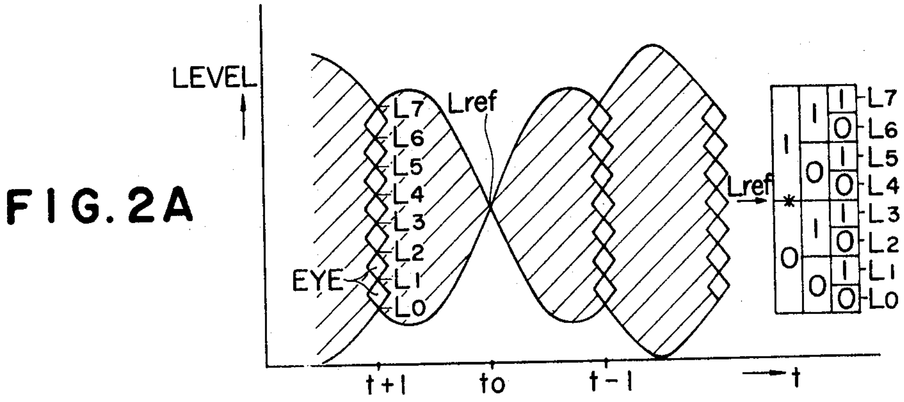
FIG. 2A illustrates an ideal eye pattern obtained on the receiving side of a transmission line in the case where an octonary signal transmitted together with a reference level signal of one level inserted therein.

A figure referred to as an eye pattern is employed for examining the identification of the levels of the multilevel signal. FIG. 2A shows an ideal eye pattern in the case where a reference level signal having one level has been inserted in the octonary signal in accordance with the present invention, the abscissa representing time and the ordinate signal level. In the figure $L_0$ to $L_7$ indicate eight levels of the multilevel signal, Lref refers to the level of the reference level signal, and EYE indicates the eye openings. Assuming that the reference level signal RLS is received at a time $t_0$, the multilevel signal MLS may have desired one of the eight levels at times $t+1$ or $t-1$ before or after $t_0$.

In an ideal case in which the levels of the received waveforms are not deformed, the received waveform always pass through the levels $L_0$ to $L_7$ at the sampling times $t+1$ and $t-1$ and that Lref at $t_0$, providing in the neighborhood of the level points regions called eye openings where no waveform exists as indicated by EYE. The waveforms lie in the regions indicated by oblique lines. The presence of the openings EYE is indispensable to the identification of the levels of the transmitted multilevel signals. Namely, a threshold level is positioned at the intermediate level point of each eye opening, EYE, by which a received signal is judged to be the level, for example, $L_0$ or $L_1$. On the right of FIG. 2A there is shown the manner of establishment of the levels $L_0$ to $L_7$ and that Lref of the reference level signal. Namely, when represented in binary number, the levels of the octonary signal are 000, 001, 010, 011, 100, 101, 110 and 111, but the level Lref of the reference level signal RLS is selected at the transition point of binary digit of a desired position of the binary number. In the illustrated example, as indicated by a mark "*" in the most significant digit, the level Lref is positioned at a point where the binary digit of this position changes from 0 to 1.

Figure 2B:
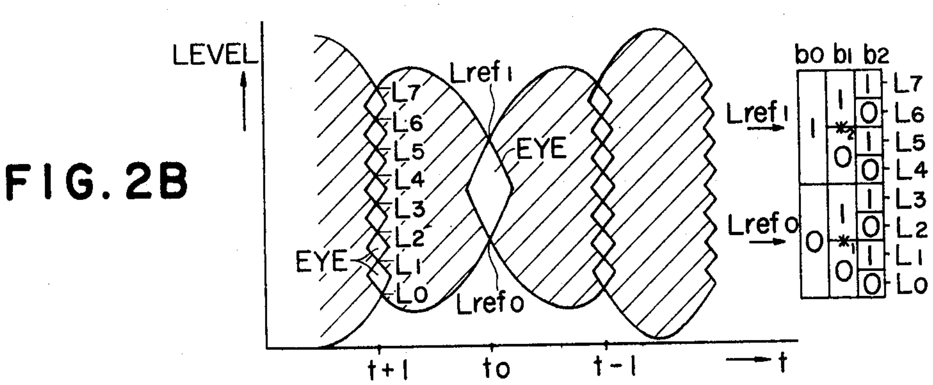
FIG. 2B similarly illustrates an ideal eye pattern obtained on the receiving side of a transmission line in the case where an octonary signal has been transmitted together with a reference level signal of two levels inserted therein.

FIG. 2B shows an ideal eye pattern in which a reference level signal RLS having two levels has been inserted in the octonary signal having eight levels in accordance with the present invention, the abscissa representing time and the ordinate representing signal level. In FIG. 2B, $L_0$ to $L_7$ designate the eight levels of the octonary signal, $Lref_0$ and $Lref_1$ refer to the levels of the reference level signal, and EYE indicates an eye opening. In an ideal case where the levels of the received waveforms them-selves are not deformed, the received waveforms always pass through the levels $L_0$ to $L_7$ at the sampling times $t+1$ and $t-1$ and those levels $Lref_0$ and $Lref_1$ at time $t_0$, with the result that there exist regions in the neighborhood of the level points where no received waveform lies, that is, the eye openings EYE. The received waveforms exist in the regions indicated by oblique lines. The levels $Lref_0$ and $Lref_1$ of the reference level signal RLS are positioned at the transition points of binary digit of a desired position of a binary number and, in the illustrated example, they are positioned at those points of the central position where the binary digit of the position changes from 0 to 1, as indicated by $*_1$ and $*_2$.

The eye patterns under ideal conditions are such as shown in FIGS. 2A and 2B. In order to detect the levels of the received signal, the received signal is sampled at the time $t+1$, $t_0$ and $t-1$ and the sampling is achieved at a time corresponding to a maximum opening portion of the eye opening EYE (the portion where the eye opening is at a maximum in a vertical direction as shown in FIG. 2). In the case of using an ordinary transmission line in which the eye pattern is likely to become deteriorated, if the sampling is achieved a little before or after the time corresponding to the maximum opening portion of the eye opening EYE, an error in the level detection increases due to noise, intersymbol interference from other symbols or the like; if the sampling time gets out of the eye opening EYE, many code errors occur. To avoid this, timing information is usually transmitted in some form from the transmitting side of the transmission line together with the multilevel signal. On the receiving side of the line, the transmitted timing information is extracted to determine the sampling time. However, deviation is caused in the sampling time by phase drift of a timing information extracting circuit, phase distortion of the transmission line, interference with the timing information by noise, signal components or the like.

Figure 3:
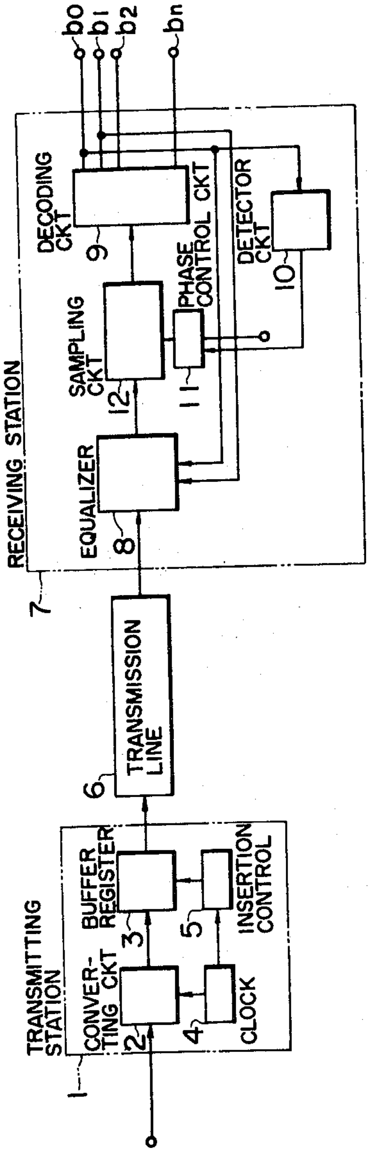
FIG. 3 shows in block form one example of a multilevel signal transmission system of this invention.

FIG. 3 shows one example of a circuit construction for correcting the deviation in the sampling time in accordance with the present invention, which utilizes the fact that the deviation in the sampling time is a relatively long period as previously described. Further, such deviation in the sampling time of a previously received signal is detected and the sampling of the subsequently received signal is corrected correspondingly.

In FIG. 3, numeral 1 designates a transmitting end station, numeral 2 indicates a binary-multilevel converting circuit for converting a digital signal into a multilevel signal, numeral 3 represents a buffer register for inserting a reference level signal in the multilevel signal with a predetermined period, numeral 4 identifies a clock circuit, numeral 5 indicates a reference level signal inserting circuit for controlling the buffer register 3, numeral 6 represents a signal transmission line, numeral 7 indicates a receiving end station, numeral 8 represents a fixed or automatic equalizer, numeral 9 refers to a multilevel decoding circuit, numeral 10 represents a detector circuit for detecting deviation in the sampling time, numeral 11 indicates a phase control circuit, numeral 12 refers to a sampling circuit, and $b_0$ to $b_n$ received and decoded output signals of binary number of $n$'s bits or $n+1$ bits.

In the transmitting end station 1, the binary-multilevel converting circuit 2 converts a digital signal to be transmitted into a multilevel signal under the control of the clock circuit 4. The binary-multilevel converting circuit 2 is a known one, which may be considered to operate on such principles that it receives in parallel a plurality of bits representing the levels of the multilevel signal and derives one analog pulse having levels corresponding thereto. Then, the multilevel pulse signal thus obtained is written in the buffer register 3, in which the reference level signal is inserted in the multilevel pulse signal with a predetermined period under the control of the control circuit 5 as described later. Thus, a composite signal such as shown in FIG. 1A is applied to the transmission line 6.

With the present invention, it is preferred to insert the reference level signal RLS in the multilevel signal with a predetermined period T for the transmission of the multilevel signal. However, when the correct levels of the multilevel signal to be transmitted can be decoded on the receiving side, it is also possible to adopt a method which does not require insertion of the reference level signal RLS.

For efficient transmission of the multilevel signal, suitable modulation, for example, such as amplitude modulation of vestigial side band, is sometimes achieved in accordance with the characteristics of the transmission line 6. For enhancement of code transmission characteristics, suitable code conversion such as, for example, error correction coding, partial response conversion is also carried out sometimes in the transmission end station 1 depicted in FIG. 3. Further, in order to reduce the required bandwidth in the transmission line 6 and to avoid the influence of noise components in the unnecessary band, the multilevel signal is usually subjected to the so-called Nyquist shaping so that the levels of the multilevel signal cross one another at right angles at points of integral multiples of its fundamental repetitive frequency.

In any case, the waveform received by the receiving end station 7 is subjected to level fluctuation and its eye pattern is usually deteriorated as compared with that shown in FIG. 2A or 2B. The received signal is sampled at such times as denoted $t_0$, $t+1$ and $t-1$ in FIGS. 2A and 2B, and its levels are decoded to provide signals $b_0$ to $b_n$.

In FIG. 3, the received signal is equalized first by the fixed or automatic equalizer 8 to remove the intersymbol interference resulting from linear distortion of the transmission line 6. The equalizer 8 is a known one, which may well be such an automatic equalizer as disclosed, for example, in BSTJ. 1966, Feb. pp. 255–286. The automatic equalizer 8 is designed so that, based upon the polarities of the received signal and a neighboring received signal, and the polarity of an error of the received signal from its predetermined level, succeeding received signal are corrected to remote the intersymbol interference therefrom. Thus, the automatic equalizer 8 automatically makes compensation for the intersymbol interference. The signal, from which the intersymbol interference has been removed by the equalizer 8 is sampled by the sampling circuit 12 and is applied to the multilevel decoding circuit which provides the output signals $b_0$ to $b_n$. The sampling time in the sampling circuit 12 is adjusted by the phase control circuit 11.

The illustrative circuit of FIG. 3 shows the case where the reference level signal RLS having one level is inserted in the multilevel signal. In this case, the binary digit of the most significant digit $b_0$ is applied to the detector circuit 10 to detect deviation in the sampling time and adjust the phase control circuit 11 correspondingly in a manner described later on with respect to FIG. 7.

Figure 4A:
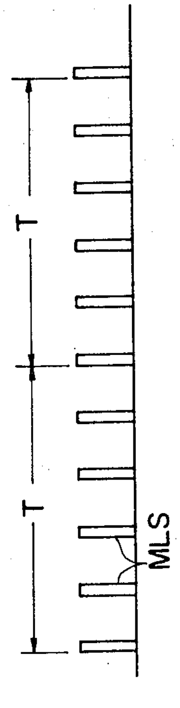
FIGS. 4A and 4B are diagrams for explaining insertion of the reference level signal in the multilevel signal on the transmitting side.
Figure 4B:
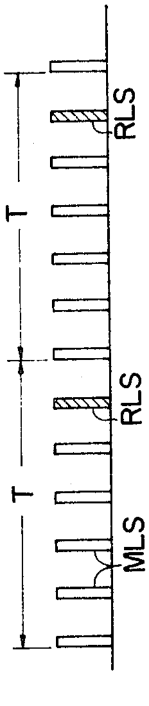
Figure 5:
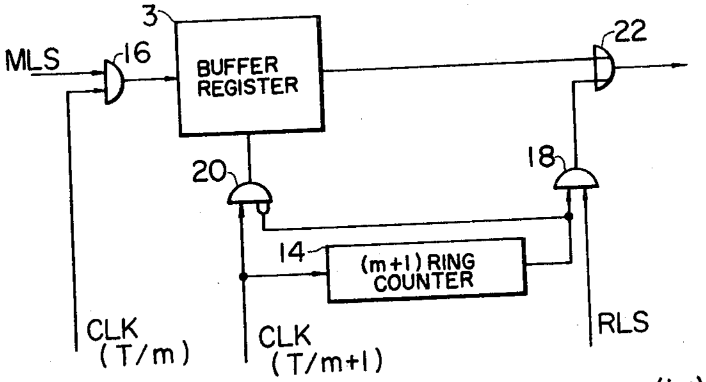
FIG. 5 illustrates in detail a reference level signal inserting circuit for use in the circuit shown in FIG. 3.

FIGS. 4 and 5 illustrate the principles of operation and construction of the buffer register 3 and the control circuit 5 therefor depicted in FIG. 3. In FIGS. 4 and 5, RLS indicates a reference level signal (having one level, for example) to be inserted in a multilevel signal in accordance with the present invention, MLS identifies the multilevel signal to be transmitted, CLK refers to a clock signal, T designates a desired period of time, $m$ refers to a desired integer, numeral 14 indicates an $(m+1)$ ring counter, numerals 16 and 18 refer to AND gate circuits and numeral 20 represents an AND gate circuit having a NOT input. The multilevel signal MLS having eight levels, which is derived from the binary-multilevel converting circuit 2 shown in FIG. 3, is written in the buffer register 3 through the AND gate circuit 16 by a clock signal CLK($T/m$) having a repetitive cycle $T/m$. Namely, $m$ number of signals MLS is written in the buffer register 3 within the time T. Then the number of signals MLS thus written in the buffer register 3 is read out through an OR gate circuit 22 by driving the AND gate circuit 18 with a clock signal CLK($T/m+1$) having a repetitive cycle $T/m+1$ except when carry of the ring counter 14 is achieved. Consequently, the reading out of the multilevel signal is interrupted for a period of time $T/m+1$ once (during carry of the ring counter 14) in the time T, during which the reference level signal RLS having one level is sent out through the enabled AND gate circuit 18 and the OR gate circuit 22.

Figure 6:
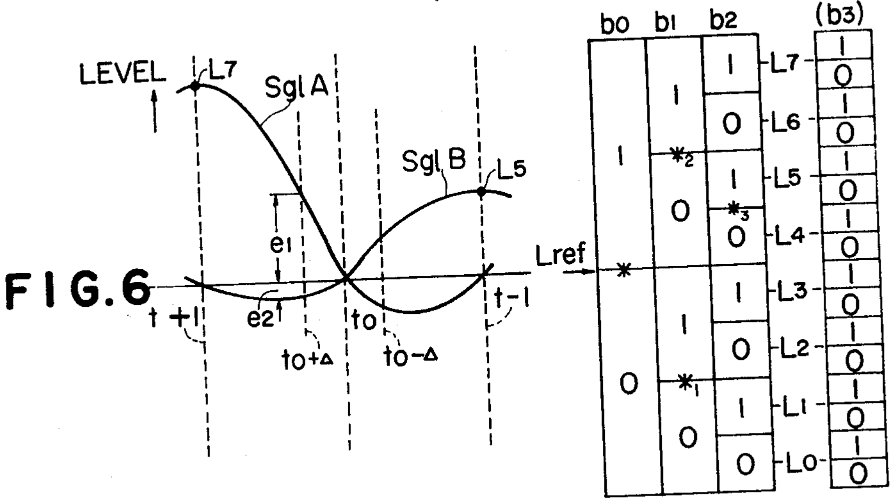
FIG. 6 is a graph for explaining deviation in the sampling time.

FIG. 6 is a graph for explaining the principle of detection of deviation in the sampling time in accordance with the present invention. In the graph of FIG. 6, the abscissa represents time; the ordinate represents the signal level; Sg1A designates a signal having the level $L_7$ in the time slot $t+1$; and Sg1B designates a signal having the level $L_5$ in the time slot $t-1$. In general, the levels of the signals Sg1A and Sg1B have little correlationship with those of other signals and are random.

The received signal equalized by the equalizer 8 at the time slot $t0$ appears as the sum of the interference components from the signals Sg1A and Sg1B, and the signal components from other time slots are subjected to the Nyquist shaping so that they cross one another at right angles at the correct sampling points at $t+1$, $t0$ and $t-1$. Accordingly, if the reference level signal RLS is sampled in the correct phase $t1$, it is not affected by the signals Sg1A and Sg1B preceding and following it and the level of the reference level signal lies at the level Lref correctly. In this case, it is expected that the frequencies of the binary digit of the most significant digit being detected to be 1 or 0 will be substantially equal to each other.

On the other hand, if the phase of the sampling pulse has advanced to $t0+\Delta$, the received value of the reference level signal RLS has the sum of level errors $e_1$ and $e_2$ under the influence of the preceding and succeeding signals Sg1A and Sg1B. The level error $e_1$ has a close interrelationship with a level difference ($L_7$—Lref) between the preceding signal Sg1A and the reference level signal RLS, and the level error $e_2$ has a close interrelationship with a level difference ($L_5$—Lref) between the succeeding signal Sg1B and the reference level signal RLS.

Since the signals Sg1A and Sg1B have random level values, they may have respectively positive or negative levels with respect to the level Lref. Therefore, the value of the sum $e$ of the level errors $e_1$ and $e_2$ may have various patterns according to the polarities of the signals Sg1A and Sg1B. In general, however, at least when the polarity of the level error $e$ has a positive correlation with the level difference between the signal Sg1A and the reference level signal RLS, that is, $L_7$—Lref in the illustrated example, or when the polarity of the level error $e$ has a negative correlation with the level difference between the signal Sg1B and the reference level signal RLS, that is, $L_5$—Lref in the illustrated example, it can be assumed that the phase of the sampling pulse has been advanced too far to the time $t+\Delta$. Further, at least when the polarity of the error $e$ has a negative correlation with the level difference $L_7$—Lref or a positive correlation with $L_5$—Lref, it can be assumed that the phase of the sampling pulse has been delayed to a time $t0-\Delta$. Especially when the level of the reference level signal RLS is selected to be the illustrated level Lref, the level error $e$ and a signal of the level difference between the signals Sg1A and Sg1B and the reference level signal RLS (or a signal representative of the polarity of the level difference signal) can be detected by using the binary digit of the most significant digit $b_0$ as it is. The aforesaid interrelationships can be obtained with a simple logic circuit such, for example, as an exlusive OR circuit.

In addition to the above transmission of the multilevel signal with the reference level signal of a predetermined level being inserted therein, a brief description will be given in connection with the case where deviation in the sampling time is detected by using the multilevel signal itself. In this case, the multilevel signal has any one of the levels $L_0$ to $L_7$ as indicated in FIG. 6. Considering, for example, a less significant digit $b_3$ (i.e., digit $b_3$ is less significant than digit $b_2$ in the illustrated example), it will be seen that any of the levels $L_0$ to $L_7$ lies at the transition point of binary digit in the digit $b_3$. Accordingly, the deviation in the sampling time can be detected with the multilevel signal by utilizing the binary digit of the position $b_3$ for detecting the error $e$. Further, it will be seen that the difference in level between this signal and a neighboring signal (or the polarity of the level difference) may be detected by the combination with the digit $b_3$ of a desired digit more significant than it. In the case of the reference level signal having more than two levels, the level error or level error signal is detected in a manner similar to the method employing the position $b_3$.

Figure 7:
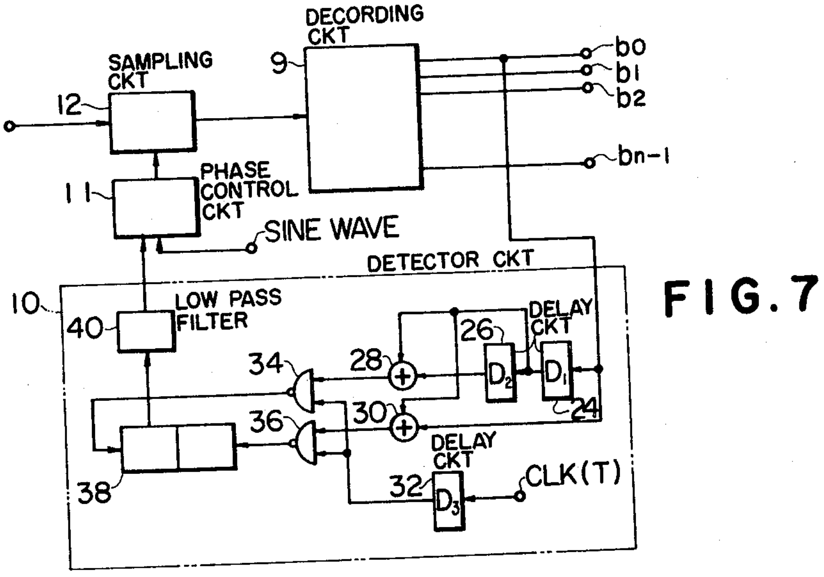
FIG. 7 shows a circuit construction employed in this invention for correcting the deviation in the sampling time on the receiving side of the transmission line, as incorporated in the system of FIG. 3.

FIG. 7 shows one example of a circuit construction for correcting the deviation in the sampling time when the reference level signal RLS has one level Lref (FIG. 6). In FIG. 7, elements similar to those in FIG. 3 are identified by the same reference numerals and characters. Numerals 24, 26 and 32 designate delay circuits for providing a delay of the time T, numerals 28 and 30 represent exclusive OR circuits, numerals 34 and 36 identify NAND gate circuits, numeral 40 refers to a low-pass filter for averaging an input signal, and CLK(T) a clock signal having a period equal to that T of the reference level signal RLS.

The signal, which has been equalized by the equalizer 8 (shown in FIG. 3) to remove the intersymbol interference therefrom in the receiving end station 7, is sampled by the sampling circuit 12 and the sampled level is decoded by the multilevel decoding circuit 9 into a binary number of $n$'s bits ($b_0$ to $b_{n-1}$) or $n+1$ bits ($b_0$ to $b_n$). The most significant digit $b_0$ represents the level $e$ of the reference level signal RLS of the level Lref and, at the same time, represents the difference in level between the neighboring multilevel signal MLS and the reference level signal RLS, and the polarity of the level difference. The most significant digit $b_0$ is delayed by the delay circuits 24 and 26 and then supplied to the exclusive OR circuits 28 and 30. When the most significant digit $b_0$ of the reference level signal RLS (representing the level difference) appears at the connection point of the delay circuits 24 and 26, the most significant digit $b_0$ of the signal Sg1A is at the output end of the delay circuit 26, and the significant digit $b_0$ of the signal Sg1B appears at the input end of the delay circuit 24. The clock signal CLK(T) synchronized with the reference level signal RLS is present at the output end of the delay circuit 32. Consequently, in the example of FIG. 6, the NAND gate circuit 34 derives an output signal $\overline{[(L_7-Lref)\cdot\overline{e}+\overline{(L_7-Lref)}\cdot e]\cdot CLK(T)}$ to set the flip-flop circuit 38 when ($L_7$—Lref) and e coincide with each other. Namely, when ($L_7$—Lref) and e have a positive correlation with each other, the flip-flop circuit 38 is set. While, the NAND gate circuit 36 provides an output signal $\overline{[(L_5-Lref)\cdot\overline{e}+\overline{(L_5-Lref)}\cdot]\cdot CLK(T)}$ to reset the flip-flop circuit 38 when ($L_5$—Lref) and $e$ coincide with each other. Namely, when ($L_5$—Lref) and $e$ have a positive correlation with each other the flip-flop circuit 38 is reset.

The output signal of the flip-flop circuit 38 is averaged by the low-pass filter 40 and supplied to the phase control circuit 11 (described later in connection with FIG. 8) to control the phase of the sampling pulse of the sampling circuit 12.

The clock signal CLK(T) can be produced in the following manner. Namely, based upon the fact that the reference level signal RLS has little interrelationship with the other multilevel signal (the fact that the levels of the multilevel signal are random), the regular phase of the signal $b_0$ coincident with the reference level signal RLS can be utilized by searching, following and detecting it with means similar to a known frame synchronizing circuit of the PCM system.

Figure 8:
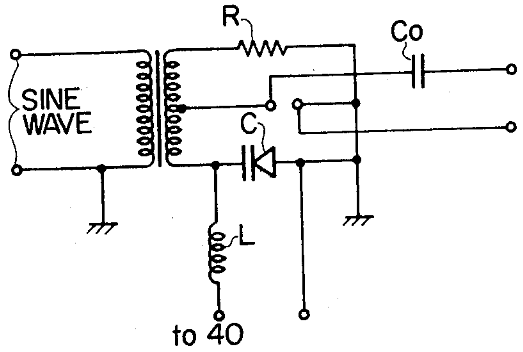
FIG. 8 illustrates one example of a phase shifter circuit incorporated into the circuit of FIG. 7.

In FIG. 8, there is shown one illustrative example of the construction of the phase control circuit 11 depicted in FIG. 7, in which a bridge circuit is formed with a resistor R and a variable capacitance diode C. From the output of the low-pass filter 40, a DC voltage is supplied through a choke coil L to both ends of the variable capacitance diode C to vary its capacitance. As a result of this, a signal derived through a capacitor $C_o$ becomes a sinewave, and the phase of a sinewave applied to the input side has been controlled; further the output signal controls the sampling time of the sampling circuit 12.

Figure 9:
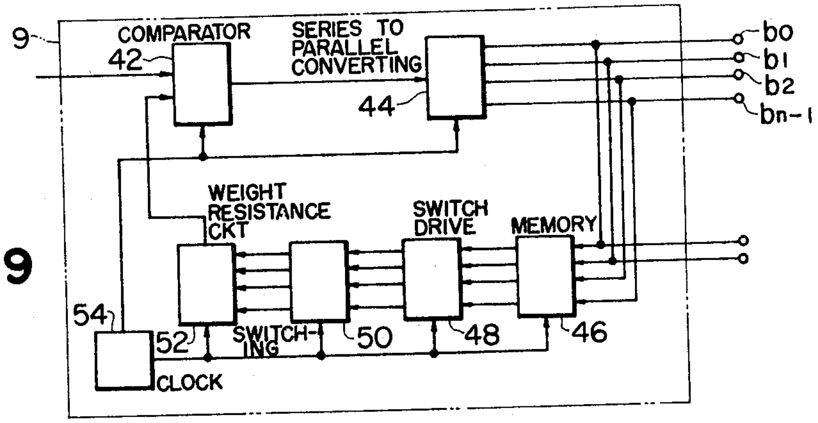
FIG. 9 shows one example of a multilevel decoding circuit as incorporated into the circuit of FIGS. 3 and 7.

FIG. 9 illustrates one example of the multilevel decoding circuit 9 depicted in FIG. 7. Numeral 42 indicates a comparator circuit for comparing the level of an input signal with a predetermined level, numeral 44 represents a circuit for converting a series binary signal into a parallel one, numeral 46 designates a memory circuit such as a flip-flop circuit for storing the signals $b_0$ to $b_{n-1}$, numeral 48 identifies a switch drive circuit for controlling a switching circuit 50 in accordance with the output from the memory circuit 46, numeral 50 indicates the switching circuit for supplying a constant current to a weight resistance circuit 52 controlled by the switching circuit 50 and numerical 54 indicates a clock circuit.

The multilevel decoding circuit 9 depicted in FIG. 9 is a known circuit referred to as a feedback-type coder, the operation of which will be briefly described. The comparator circuit 42 has a comparison reference point such as shown in FIG. 6. At first, the comparison reference point is selected to be at the transition point of binary digit in the most significant digit as indicated by *. When supplied with an input signal, the comparator circuit 42 provides an output 1 or 0 according to whether the level of the input signal is above or below the aforesaid comparison reference point *. If, now, the input signal level lies at $L_5$, as shown in FIG. 6, the comparator circuit 42 provides the output 1 in the above case. The output 1 of the most significant digit is derived in the form of 1 as the signal $b_0$ from the converting circuit 44 and the output 1 is stored in the memory circuit 46. The memory circuit 46 controls the weight resistance circuit 52 through the switch drive circuit 48 and the switching circuit 50. As a result of this, the comparison reference point of the comparator circuit 42 is raised by one-half of the level of the most significant digit to be set at the transition point of the binary digit (marked with *2) in the second position shown in FIG. 6. Then, the input signal of the aforementioned level $L_5$ is compared with the comparison reference point set as above described to provide an output 0 as the signal $b_1$. With the output 0, the comparison reference point of the comparator circuit 42 is lowered by one-half of the level of the second position to be set at a point *3 in FIG. 6 in the manner above described. Then, the input signal of the level $L_5$ compared with the comparison reference point set above to provide an output 1 as the signal $b_2$. Thereafter, the less significant bits are sequentially detected. In the case of correcting the deviation in the sampling time with the signal of eight levels, detection is achieved down to the fourth digit $b_3$ to produce outputs correspondingly.

Since the level Lref of the reference level signal RLS is selected as shown in FIG. 6, variations in the level of the received reference level signal can be directly detected with the binary digit of the signal $b_0$. However, the level is not limited specifically to the first digit, but may be selected at the transition point of binary digit in any desired position. In this case, the binary digits of the selected position and a more significant position are employed for correcting the sampling time.

Figure 10:
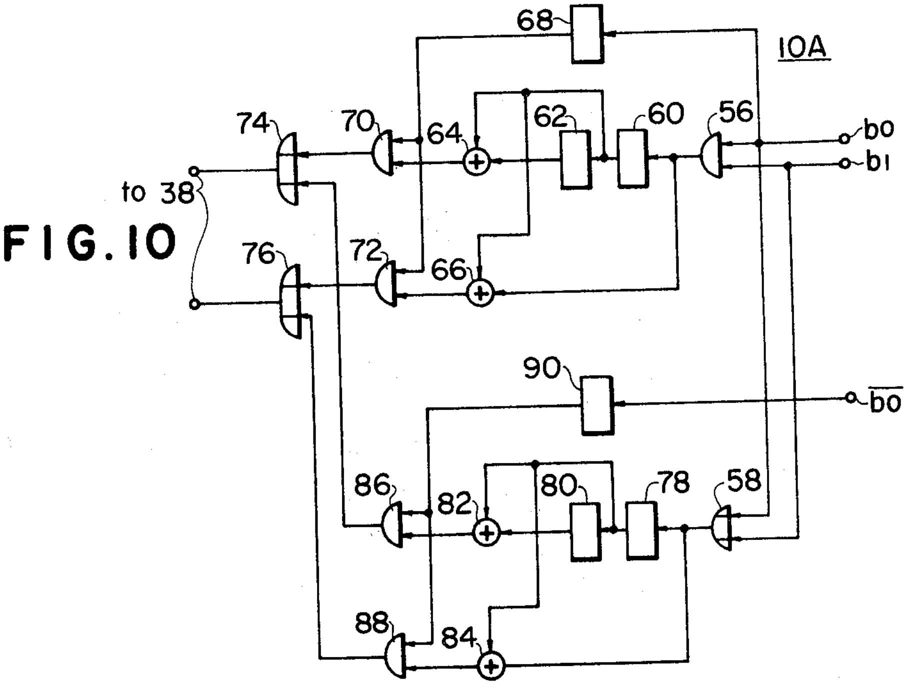
FIG. 10 shows another example of the circuit construction for correcting deviation in the sampling time.

FIG. 10 shows a detecting unit 10A, similar to the sampling time deviation detector circuit 10 of FIG. 7, which is used in the case where the reference level signal RLS has two levels as shown in FIG. 2B. In FIG. 10, numerals 60, 62, 68, 78, 80 and 90 indicate delay circuits for providing a delay time T, numerals 64, 66, 82 and 84 represent exclusive OR circuits, numerals 56, 70, 72, 86 and 88 refer to AND gate circuits, and numerals 58, 74 and 76 identify OR gate circuits. In the case of FIG. 2B, the error of the level from the level $Lref_0$ can be detected with the binary digits of the most significant position $b_0$ and an immediately less significant position $b_1$. It will be seen that when the level error is positive the binary digits of the positions $b_0$ and $b_1$ are 0 and 1, respectively, and that when the error is negative the binary digits of the positions $b_0$ and $b_1$ are 0 and 0, respectively. Further, it also is seen that when the level error from the level $Lref_1$ is positive, the binary digits of the positions $b_0$ and $b_1$ are 1 and 1, respectively, and that when the error is negative, the binary digits are 1 and 0, respectively.

The AND gate circuit 56 shown in FIG. 10 detects the state of the binary digits of the positions $b_0$ and $b_1$ being 1 and 1, respectively; that is, the state of the level error being positive relative to the level $Lref_1$. While the OR gate circuit 53 detects the time when at least one of the positions $b_0$ and $b_1$ is 1 but it is effective only when supplied with a signal $\overline{b_0}$ through the delay circuit 90, so that the OR gate circuit 58 can be regarded to detect the state of the level error being positive relative to the level $Lref_0$. In the case of the states 1 and 1, the delay circuits 60, 62 and 68 and the exclusive OR circuits 64 and 66 operate in the same manner as above described in connection with FIG. 7. Further, in the case of the states 0 and 1, the delay circuits 78, 80 and 90 and the exclusive OR circuits 82 and 84 also operate in the same manner and the OR gate circuit 74 sets the flip-flop circuit 38 (as shown in FIG. 7) and the OR gate circuit 76 resets the flip-flop circuit 38. The other operations will be readily understood from the foregoing description given in connection with FIGS. 7 and 10.

In the present invention, in the case where the deviation in the sampling time is detected by a previously received multilevel signal without inserting the reference level signal RLS therein to control the sampling time of a subsequently received signal, that is, in the case where a level error is detected by using the digit $b_3$ less significant than the digit $b_2$ and a level difference signal or a level difference polarity signal is detected by using the binary digits of the position $b_3$ and a more significant one, the detector circuit 10 for detecting the deviation in the sampling time will be more complicated in construction than that depicted in FIG. 10 but such construction will easily be understood by those skilled in the art from FIG. 10.

As has been described in the foregoing, in the present invention the deviation in the sampling time of the previously received signal is detected to correct the sampling time of the subsequently received signal based upon the fact that the deviation in the sampling time due to phase distortion or the like of the transmission line is appreciably slow, so that the present invention has an advantage that correct sampling can always be achieved as a whole.

With the method of inserting the reference level signal RLS of a predetermined level in the multilevel signal MLS with a predetermined period T, even if the eye pattern has become considerably deteriorated, the deviation in the sampling time can be held correctly, thereby greatly reducing the occurrences of decoding error. In the case of the method of inserting the reference level signal RLS in the multilevel signal MLS, the insertion of the reference level signal is achieved for a predetermined period of time utilizing the difference in speed between writing of the signal in the buffer register and reading out therefrom, so that the predetermined object can be attained by relatively simple means. Further, since the level error and the level difference signal or the level difference polarity signal are detected with the binary digit of a predetermined position of a decoded binary number, these detections are very easy.

Numerous changes may be made in the above described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is:

1. Apparatus for transmitting and receiving a train a multilevel signals having a given number of levels over a transmission line having input and output terminals, said apparatus comprising:

transmission means coupled to the input terminal of the transmission line for applying the train of the multilevel signals to the input terminal of the transmission line; and receiving means coupled to the output terminal of the transmission line, said receiving means including sampling means for sequentially receiving and sampling each of the transmitted multilevel signals of the train at a predetermined sampling rate, level error detection means for detecting a level error between the level of one of the transmitted multilevel signals and that of a corresponding multilevel signal to be transmitted by said transmission means, said level difference detection means including level difference polarity detection means for detecting the polarity of the level difference between the one transmitted multilevel signal and each of other multilevel signals received and sampled before or after the one transmitted multilevel signal in the train, and control means for detecting agreement or disagreement between the polarity of the level error and that of the level difference to control the sampling time of said sampling means in accordance with the agreement or disagreement.

2. Apparatus as claimed in claim 1, wherein said transmission means includes reference means for inserting a reference level signal having a predetermined level in the train of the multilevel signal at a predetermined period, and said sampling means of said receiving means samples the transmitted multilevel signal with the predetermined period of the reference level signal to detect a level error of the sampled reference level signal for controlling the sampling rate of the transmitted multilevel signal.

3. Apparatus as calimed in claim 1, wherein said transmission means includes:

storage means, clock means for generating a first, repetitive clock signal at intervals of $T/m$, where T is a predetermined interval of time and $m$ is a predetermined integer and for generating a second, repetitive clock signal at an interval of $T/(m+1)$;

means responsive to the first clock signal for storing the multilevel signals in said storage means;

means responsive to the second clock signal for retrieving from said storage means a train of the multilevel signal, and means for inserting at the time intervals of T the reference level signals into the train of multilevel signals retrieved from said storage means.

4. Apparatus as claimed in claim 1, wherein each level of the multilevel signals to be transmitted is representative of a binary number of $n$'s bits, where $n$ is a predetermined integer, said receiving means including decoding means for receiving the transmitted multilevel signal and for providing a binary digit of more than $n+1$ bits for decoding the binary number corresponding to the level of the transmitted signal, said level error detection means providing a level error between at least one of the levels of the transmitted multilevel signal sampled at the predetermined sampling rate and the correct level of a multilevel signal to be transmitted by comparison with a binary digit of a position less significant than the least significant one of the $n$'s bits.

5. Apparatus as claimed in claim 1, wherein each level of the multilevel signal to be transmitted is represented with a binary number of $n$'s bits, where $n$ is a predetermined integer, said transmission means including means for providing the level of the reference level signal of a selected magnitude corresponding to the transition point of the binary digit of selected position of the $n$'s bits.

6. Apparatus as claimed in claim 5, wherein said level error detection means detects the error difference between the level of the transmitted reference level signal and a predetermined level of the multilevel signal to be transmitted with respect to a binary digit of the selected position.

7. Apparatus as claimed in claim 6, wherein said level error detection means includes decoding means for receiving and decoding the transmitted multilevel signal into a binary number of $n$'s bits indicative of the level of the transmitted multilevel signal, and means for delaying coupled to said decoding means for delaying the binary digit of the position selected from the decoded binary number of the $n$'s bits for a predetermined period of time, to thereby provide a signal indicative of the difference in level between the transmitted signal and that signal adjacent in the train to the aforementioned signal.

8. Apparatus as claimed in claim 7, wherein said delay means delays both the binary digit of a selected position and that digit of a position more significant than the selected binary digit, for the predetermined period of time.

9. Apparatus as claimed in claim 1 wherein said level error detection means includes an exclusive OR circuit for correlating the level error of the transmitted multilevel signal with the level difference between the transmitted signal and the signal in the train disposed adjacent thereto.

10. Apparatus as claimed in claim 9, wherein said level error detection means further includes average means for averaging the output signal derived from said exclusive OR circuit for controlling the sampling time of said sampling means dependent upon the averaged output signal therefrom.

11. Apparatus for transmitting a train of multilevel signals having a given number of levels over a transmission line having input and output terminals, said apparatus comprising:

transmission means coupled to the input terminal of the transmission line for applying the train of the multilevel signals to the input terminal of the transmission line; and receiving means coupled to the output terminal of the transmission line, said receiving means including sampling means for sequentially receiving and sampling the transmitted multilevel signals of the train at a predetermined sampling rate, level difference detection means for determining a first level difference between the level of one of the transmitted multilevel signals and its level as established by said transmission means and a second level difference between the level of the one transmitted multilevel signal and the level of another multilevel signal adjacent thereto in the train, and control means for comparing the first and second level differences to adjust the sampling time of said sampling means.

* * * * *